United States Patent [19]

Stein

[11] Patent Number: 5,077,818
[45] Date of Patent: Dec. 31, 1991

[54] COUPLING ARRANGEMENT FOR OPTICALLY COUPLING A FIBER TO A PLANAR OPTICAL WAVEGUIDE INTEGRATED ON A SUBSTRATE

[75] Inventor: Karl-Ulrich Stein, Unterhaching, Fed. Rep. of Germany

[73] Assignee: Siemens Aktiengesellschaft, Munich, Fed. Rep. of Germany

[21] Appl. No.: 583,219

[22] Filed: Sep. 17, 1990

[30] Foreign Application Priority Data

Sep. 29, 1989 [DE] Fed. Rep. of Germany ....... 3932657

[51] Int. Cl.$^5$ ................................................ G02B 6/30
[52] U.S. Cl. ........................................ 385/49; 385/51; 385/52
[58] Field of Search ............... 350/96.11, 96.12, 96.15, 350/96.17, 96.20

[56] References Cited

U.S. PATENT DOCUMENTS 4,767,174  8/1988  Carenco et al. ................. 350/96.20
4,973,133  11/1990  Matz et al. ................... 350/96.17 X

FOREIGN PATENT DOCUMENTS 61-117513  6/1986  Japan ................................. 350/96.17
61-166504  7/1986  Japan ................................. 350/96.17
63-96608   4/1988  Japan ................................. 350/96.17
64-04710   1/1989  Japan ................................. 350/96.17

OTHER PUBLICATIONS

Optoelektronik Magazin, vol. 4, No. 6/7, 1988, pp. 556–563.
Keiser, "Optical Fiber Communications", McGraw-Hill, pp. 124–125.

Primary Examiner—John D. Lee
Attorney, Agent, or Firm—Hill, Van Santen, Steadman & Simpson

[57] ABSTRACT

A coupling arrangement for optically coupling a fiber to a planar optical waveguide integrated on a substrate, such as employed in silicon micromechanical units. The substrate together with the waveguide and a cover member placed over the waveguide form component parts of a carrier member. The carrier member is fashioned such that the end of the waveguide lies in an end face of the carrier member. Two triangular openings between which the waveguide is arranged, are fashioned in the end face of the carrier member. The end face of the carrier member has a dimension similar to an outside diameter of the fiber and the end face of the fiber has its outer circumference welded to the end face of the carrier member.

10 Claims, 1 Drawing Sheet

FIG 1
FIG 2
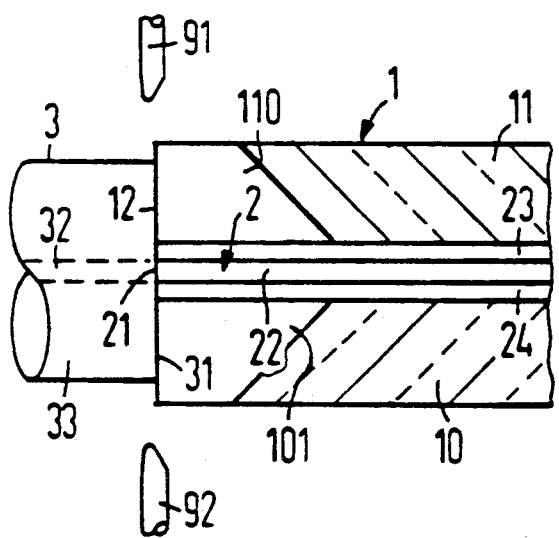
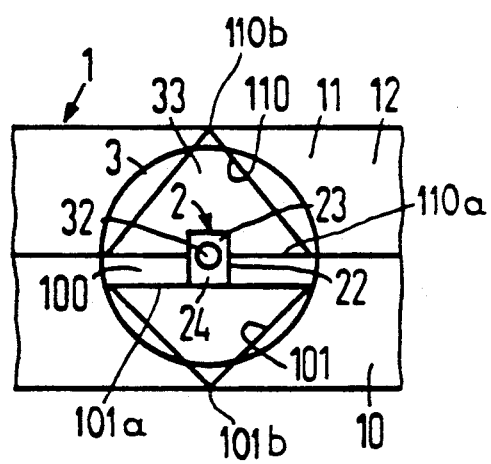

COUPLING ARRANGEMENT FOR OPTICALLY COUPLING A FIBER TO A PLANAR OPTICAL WAVEGUIDE INTEGRATED ON A SUBSTRATE

BACKGROUND OF THE INVENTION

The invention is directed to a coupling arrangement for optically coupling a fiber to a planar optical waveguide integrated on a substrate, whereby one end face of the planar waveguide and one end face of the fiber lie opposite one another.

A coupling arrangement of the said species is proposed in European patent application 89 116 456.8 and corresponding U.S. Ser. No. 406,599 (now U.S. Pat. No. 4,973,133). In this coupling arrangement, the fiber is planar waveguide.

SUMMARY OF THE INVENTION

It is an object of the invention to specify a simply and cost-beneficially manufacturable coupling arrangement of the said species wherein the fiber can be butt-coupled to the planar waveguide with high coupling efficiency by fusing to the substrate.

This object is achieved by the features of the substrate together with the waveguide being a component part of a carrier member that is fashioned such that the end face of the waveguide lies in an end face of the carrier member and in that two openings between which the waveguide is arranged are fashioned in the end face of the carrier member; and in that the end face of the carrier member has a dimension similar to the outside diameter of the fiber; and in that the end face of the fiber has its outer circumference welded to the end face of the carrier member. Furthermore, the two openings can each comprise a triangular cross section and the carrier member also comprises a cover member applied on the substrate. It is particularly advantageous that the carrier member is composed of an anisotropically etchable material such as silicon.

The invention shall be set forth by way of example in greater detail in the following description with reference to the figures.

BRIEF DESCRIPTION OF THE DRAWINGS

FIG. 1 is a longitudinal section through an exemplary embodiment of the coupling arrangement of the invention; and FIG. 2 is an end view onto the end face of the carrier member of the embodiment of FIG. 1.

DETAILED DESCRIPTION OF THE PREFERRED EMBODIMENTS

In the exemplary embodiment of FIGS. 1 and 2, a planar waveguide 2 is integrated at the surface of a substrate 10 preferably composed of silicon, and is covered by a cover member 11 preferably composed of silicon. Together, the substrate 10 and a cover member 11 form a carrier member 1 that is thus composed of two silicon parts and that comprises an end face 12 in which a waveguide end face 21 of the planar waveguide 2 is arranged.

A first triangular opening 101 and a second triangular opening 110 are fashioned in this end face 12 of the carrier member 1 and extend from this end face 12 into the depth of the carrier member 1 in a direction parallel to the planar waveguide 2. The first triangular opening 101 fashioned under the waveguide 2 in the substrate 10 is arranged such with reference to its triangular cross-section that a first triangle side 101a of this cross-section is parallel to the horizontal plane of the waveguide 2 in FIG. 1 and 2 and a first angle 101b of the triangle that lies opposite this first triangle side points downwardly away from the waveguide 2. The second triangular opening 110 fashioned above the planar waveguide 2 in the cover member 11 in FIG. 2, is arranged such with reference to its triangular cross-section that a second triangle side 110a of this cross-section is parallel to a plane of the planar waveguide 2 that proceeds horizontally in FIG. 1 and 2, and a second angle 110b of this triangular cross section lying opposite this second triangle side points upwardly away from the waveguide 2.

Together, the two triangular openings 101 and 110 essentially form a quadrilateral in plan view, having a web 100 of the carrier member 1 that diagonally joins two corner points of this quadrilateral that lie opposite one another, this web 100 remaining between the two openings 101 and 110 and the planar waveguide 2 having its end face 21 arranged therein. The openings 101 and 110 can be produced by anisotropic etching of the silicon of the substrate 10 and the cover member 11.

The fiber 3 has its end face 31 placed flatly against the end face 12 of the carrier member 1 that has a dimension similar to the outside diameter of the fiber 3. The fiber 3 has its circumference fixed to the carrier member 1 by fusing in an arc, whereby the fiber 3 and the carrier member 1 are fused in controller fashion by a regulated positioning before and during the application of the arc to the fiber 3, so that the fiber 3 and the planar waveguide are essentially coaxial (regarding the bonding technique, see Optoelektronik Magazin, Vol. 4 Nos. 6/7 1988, pp. 556ff). The welding electrodes that generate the arc are referenced 91 and 92 in FIG. 1.

In the figures, the fiber 3 is composed of a core-cladding fiber having a core 32 and a cladding 33 that surrounds the core. The planar waveguide is composed of a core layer 22 and of two cladding layers 23 and 24 between which the core layer is arranged.

Although the present invention has been described with reference to a specific embodiment, those of skill in the art will recognize that changes may be made thereto without departing from the scope and spirit of the invention as set forth in the appended claims.

I claim as my invention:

1. A coupling arrangement for optically coupling a fiber to a planar optical waveguide, where one end face of the planar waveguide and one end surface of the fiber lie opposite one another, comprising:

said fiber having said end surface, and having an outside diameter and an outer circumference at said end surface; and a carrier member which comprises a substrate with said planar waveguide integrated thereon, said carrier member having a second end face fashioned with the end face of said planar waveguide lying therein, said second end face further providing two openings between which the planar waveguide is arranged, wherein said two openings each comprise a triangular cross section, said second end face of said carrier member having a dimension similar to said outside diameter of said fiber at said end surface, and wherein said end surface of said fiber has said outer circumference welded to said second end face of said carrier member.

2. A coupling arrangement according to claim 1, wherein said substrate is composed of an anisotropically etchable material.

3. A coupling arrangement according to claim 1, wherein said carrier member further comprises a cover member applied on said substrate.

4. A coupling arrangement according to claim 3, wherein said substrate and said cover member are composed of an anisotropically etchable material.

5. A coupling arrangement according to claim 1, wherein said carrier member is composed of an anisotropically etchable material.

6. A coupling arrangement according to claim 5, wherein said carrier member is composed of silicon.

7. A coupling arrangement for optically coupling a fiber to a planar optical waveguide, where one end face of the planar waveguide and one end surface of the fiber lie opposite one another, comprising:

said fiber having said end surface, and having an outside diameter and an outer circumference at said end surface; and a carrier member which comprises a substrate with said planar waveguide integrated thereon, said carrier member having a second end face fashioned with the end face of said planar waveguide lying therein, said second end face further providing two openings between which the planar waveguide is arranged, said second end face of said carrier member having a dimension similar to said outside diameter of said fiber at said end surface, and wherein said end surface of said fiber has said outer circumference welded to said second end face of said carrier member, and wherein said carrier member further comprises a cover member applied on said substrate, and wherein said second end face is applied on said cover member and said substrate and said cover member comprise;

a first triangular channel propagating from said second end face into a depth of said cover member in a direction axially parallel to said planar waveguide; and said substrate comprises a second triangular channel propagating through said substrate into a depth of said substrate from said second end face in a direction axially parallel to said planar waveguide, said first triangular channel and said second triangular channel oriented to have a common open side between said first triangular channel and said second triangular channel; and said carrier member further comprises a web member lying in said second end face of said carrier member, spanning said common open side and supporting said end face of said planar waveguide in said second end face between said two openings, said first triangular channel, said second triangular channel, and said web member holding said waveguide together defining said two openings in said second end face.

8. A coupling arrangement according to claim 7, wherein said cover member and said substrate are composed of an anisotropically etchable material.

9. A coupling arrangement according to claim 8, wherein said planar waveguide comprises a core layer surrounded by a cladding layer; and said fiber comprises a core surrounded by a core-cladding, said core abutting said core layer, and an outer perimeter of said core-cladding, which defines said outer circumference, is welded to both said cover member and said substrate in said second end face.

10. A coupling arrangement according to claim 9, wherein said first triangular channel and said second triangular channel form in cross section a first isosceles triangle and a second isosceles triangle respectively, said first isosceles triangle and said second isosceles triangle arranged with parallel bases and arranged to point in opposite directions, a first axis bisecting said first isosceles triangle, and a second axis bisecting said second isosceles triangle being collinear and passing through said planar waveguide in said second end face.

* * * * *